US009805395B2

(12) United States Patent
Nicholas et al.

(10) Patent No.: US 9,805,395 B2
(45) Date of Patent: Oct. 31, 2017

(54) ONLINE MARKETING SYSTEM AND METHOD

(75) Inventors: Frank C. Nicholas, Glenview, IL (US); Ian B. Carswell, Chicago, IL (US)

(73) Assignee: Dizpersion Corporation, Evanston, IL (US)

(*) Notice: Subject to any disclaimer, the term of this patent is extended or adjusted under 35 U.S.C. 154(b) by 995 days.

(21) Appl. No.: 13/354,294

(22) Filed: Jan. 19, 2012

(65) Prior Publication Data
US 2013/0190072 A1    Jul. 25, 2013

(51) Int. Cl.
| A63F 13/00 | (2014.01) |
| G06Q 30/02 | (2012.01) |
| A63F 9/24 | (2006.01) |
| G06Q 30/08 | (2012.01) |

(52) U.S. Cl.
CPC .......... G06Q 30/0261 (2013.01); A63F 9/24 (2013.01); G06Q 30/08 (2013.01)

(58) Field of Classification Search
CPC ............ G06Q 10/02; G06Q 10/06; G06Q 10/063112; G06Q 10/063114; G06Q 10/0633; G06Q 10/0639; G06Q 10/06393; G06Q 20/00; G06Q 20/04; G06Q 20/0453; G06Q 20/08; G06Q 20/10; G06Q 20/12; G06Q 20/123; G06Q 20/14; G06Q 20/145; G06Q 20/16; G06Q 20/20; G06Q 20/22; G06Q 20/24; G06Q 20/26; G06Q 20/28; G06Q 20/60; G06Q 20/305; G06Q 20/32; G06Q 20/3255; G06Q 30/00; G06Q 30/01; G06Q 30/02; G06Q 30/0201; G06Q 30/0207; G06Q 30/0208; G06Q 30/0209; G06Q 30/0211–30/0221; G06Q 30/0226; G06Q 30/0227

USPC .................................................... 463/25, 42
See application file for complete search history.

(56) References Cited

U.S. PATENT DOCUMENTS

| 7,454,363 | B1* | 11/2008 | Rowe ................... | G06Q 20/042 463/29 |
| 2003/0198346 | A1 | 10/2003 | Meifu | |
| 2004/0097281 | A1* | 5/2004 | Rossides ................ | G06Q 30/06 463/16 |
| 2006/0069619 | A1* | 3/2006 | Walker et al. .................. | 705/14 |
| 2008/0109246 | A1 | 5/2008 | Russell | |
| 2008/0182644 | A1* | 7/2008 | Lutnick ............... | G07F 17/3258 463/20 |
| 2009/0098923 | A1* | 4/2009 | Randhawa ........... | G06Q 20/045 463/17 |
| 2012/0203619 | A1 | 8/2012 | Lutnick | |
| 2013/0006739 | A1 | 1/2013 | Horvitz et al. | |

FOREIGN PATENT DOCUMENTS

| WO | 0108071 A1 | 2/2001 |
| WO | 0111523 A1 | 2/2001 |
| WO | 2013090694 A1 | 6/2013 |

* cited by examiner

Primary Examiner — Milap Shah
Assistant Examiner — Jeffrey Wong
(74) Attorney, Agent, or Firm — Cardinal Law Group

(57) ABSTRACT

A computer readable storage medium includes computer executable instructions which, when executed by a processor, causes the processor to perform a method of online marketing. At least one deal is associated with at least one competition. A plurality of user requests is received to compete for the deal as participants in the competition. Deal payment terms are determined for the deal based on a competition result of the competition.

27 Claims, 15 Drawing Sheets

1500

ONLINE MARKETING SYSTEM AND METHOD

FIELD OF THE INVENTION

The present invention generally relates to consumer access to discounted products or services. More specifically, the present invention relates to the creation, purchasing, management, promotion, tracking, and price modeling associated with discounted products or services.

BACKGROUND OF THE INVENTION

The networked world provides numerous methods for the purchase of products and services. Networked markets have been set up to provide goods and services via fixed price, auction, reverse auction, and other methods. Further, the networked world has provided access to many coupons and discount codes for products and services, as well as access to information about generally available specials and discounts. Over the past several years, there has been an increased adoption of purchased certificates for discounted products or services. For example, Groupon™ provides discounted certificates for daily deals that require a certain number of participants for the deal to be transacted. By way of another example, Restaurant.com provides discounted certificates to eating establishments.

A wide variety of computer and mobile device games and competitions exist, some network based. Several currently popular examples include Angry Birds, Farmville, and fantasy football. While many people participate in these competitions and games without clear economic purpose or incentive, some of the existing players might prefer to participate with some such incentive, and some new players may begin to participate based on some incentive.

As more and more companies provide consumers with the opportunity to purchase discounted certificates, it becomes important to provide consumers with additional attraction to the purchase opportunities. The present invention describes ways in which consumers may be attracted to or incented to participate in discounted certificate purchase opportunities.

The number of sites and services providing discounted certificates for daily deals and other paid discount certificates has increased tremendously. Some providers are established and trustworthy. Others perhaps less so. Regardless of trustworthiness, the sheer number of providers leads to an equally large number of accounts a consumer must maintain to use those services. The present invention describes ways in which a central agent service may manage a consumer's accounts and purchases.

Some purveyors of deal certificates offer only one per day. Others list many simultaneous offerings. When also taking into account coupons, discount codes, and generally available specials and discounts, there are a tremendous number of offerings a consumer might consider. The present invention describes ways in which a concierge service may prioritize, present, purchase and organize opportunities for discounted products or services.

SUMMARY OF THE INVENTION

One aspect of the invention includes a method of online marketing. The method includes: associating at least one deal with at least one competition, receiving a plurality of user requests to compete for the deal as participants in the competition, and determining deal payment terms for the deal based on a competition result of the competition. The method may further include setting a competition participant threshold for a predetermined number of participants, displaying the required payment for each place in the competition based on the deal payment terms, displaying a score to beat during the competition, and associating at least one add-on deal with at least a portion of the participants.

Another aspect of the invention provides a method for advertising. The method includes: receiving participant fees for a first team of participants for a deal competition, receiving participant fees for a second team of participants for a deal competition, and determining a first deal for the first deal participants and a second deal for the second team participants based on a competition result.

Another aspect of the invention provides a method for marketing. The method includes: receiving a plurality of requests to sell a number of prepaid certificates from a plurality of vendors, sending acceptance responses to the vendors based on the requests, assigning a code for each prepaid certificate, providing a predetermined profit margin for sale of the certificates, receiving a revenue input based on results of a first marketing event, determining an operating profit margin for a second marketing event based on the received revenue input and the predetermined profit margin, and operating a second marketing event in accordance with the operating profit margin. The method may further include receiving at least one add-on request from an advertiser for a number of add-on advertisements, sending an acceptance based on the add-on request, and determining the operating profit margin for the second marketing event based on the add-on advertisements.

DETAILED DESCRIPTION OF A PRESENTLY PREFERRED EMBODIMENT

Figure 1:
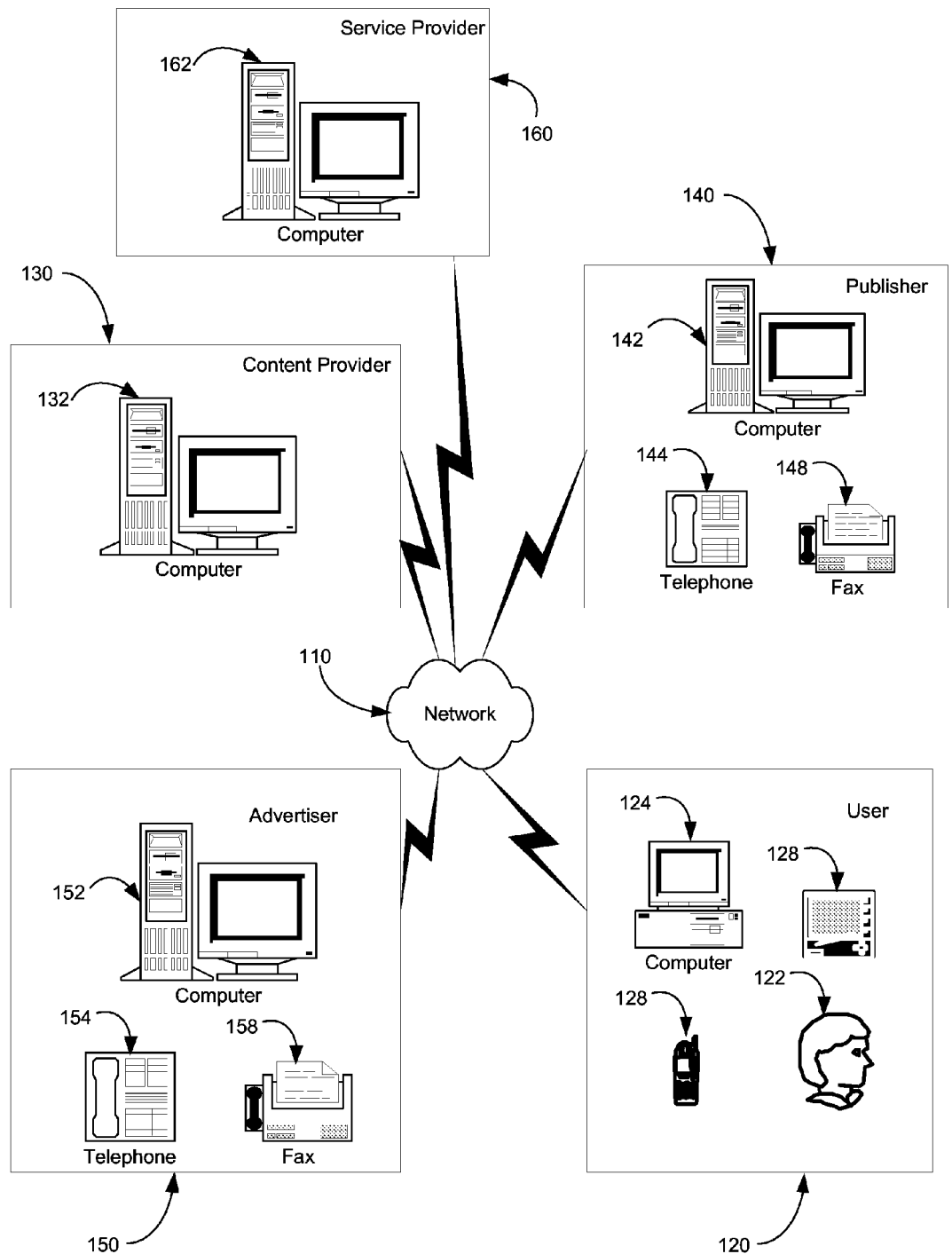
FIG. 1 illustrates an exemplary environment for practicing the present invention.

Referring to FIG. 1, a telecommunication system 100 of the present invention is shown. Telecommunication system 100 comprises a network 110 which provides the communications links between the various nodes of telecommunication system 100. Links through network 110 may include permanent connections (e.g., wire or fiber optic cables), temporary connections made through telephone, wireless or satellite communications, or various nodes of telecommunication system 100 may actually be hosted on the same physical hardware platform removing the necessity of a network link altogether. Network 110 may be in the form of public or private connections available over the Internet, an extranet, an intranet, a hard-wired local area network (LAN), a hard-wired wide area network (WAN), a wireless LAN, a wireless WAN, cellular network, satellite network, and/or other forms as would occur to those having ordinary skill in the art.

A user node 120 of telecommunication system 100 operates to facilitate communications information in audio form and/or visual form between a user 122 of user node 120 and one of the other nodes of telecommunication system 100. The information may be requested by user node 120 or may be pushed to user node 120 by another node. Devices, apparatuses and systems, such as for example, a cell phone 126, a personal digital assistant 128, and a personal computer 124 as illustrated, or any other user communication devices may be utilized within user node 120 to establish such communications. Devices, apparatuses and systems around the user may also be considered portions of user node 120, for example a digital signpost or digital billboard 129. Other suitable devices, apparatuses and systems not illustrated include networked household appliances (e.g., televisions, refrigerators, etc.), digital or satellite radio systems, and others as would occur to those having ordinary skill in the art.

A content provider node 130 includes one or more servers 132 for communicating with the other nodes of telecommunication system 100. The requested information, pushed information, and generally provided content can be in a variety of forms, such as, for example, a static or dynamic web page (HTML or XML), a radio or video broadcast or narrowcast, wireless application protocol (WAP) content, a short messaging service (SMS) message, or other forms of network information as known in the art. All content may be provided as the entirety of requested or provided content, or as a portion. For example, content provider node 130 may provide an entire web or WAP page or only a segment of a page. Accordingly, content server 132 can include suitable hardware platforms and software modules to operate as a web site server, a radio broadcast server, etc.

Referring again to FIG. 1, publishing node 140 includes one or more servers 142 for communicating with the other nodes of telecommunication system 100. Publishing node 140 may include apparatus and communications devices such as telephone 144, or fax machine 146. In one embodiment, publishing node 140 provides some portion or all of the content for content provider 130. Publishing node 140 may also publish content or advertisements for advertiser node 150. Publishing node 140 may include interfaces for uploading or inputting by some means content that is to be published via network 110.

Advertiser node 150 represents advertisers that may be any of an end advertiser of a product or service, a marketer, a publicist, a politician, any other similar party, or any party acting as an agent of the advertiser such as a media company, public relations company, advertising agency, or traditional publication. Advertiser node 150 may include apparatus and communications devices such as computer 152, telephone 154, or fax machine 156.

Service provider node 160 includes one or more servers 162 for communicating with the other nodes of telecommunication system 100. While displayed as a single node, service provider node 160 represents any number of separate companies, services, nodes and servers. For example, Mapquest or Google Maps may provide mapping functionality and services via mapping service server 162. Email service may be provided by Hotmail, Gmail, or Yahoo Mail via mail service service 162. Evite may provide event invitation and response management services via invitation service server 162. OpenTable may provide reservation services via reservation service server 162. Quova may provide IP-to-geography translation services via IP-to-geography translation server 162. Gracenote or Shazam may supply music identification services through its CDDB product and services via music identification server 162. Facebook, MySpace, or the like may provide social network services via social network server 162. Facebook or Google may provide authentication services via authentication server 162. Paypal or Verisign may provide payment services via payment server 162. Groupon, Living Social, Restaurant.com, or the like may provide deal certificate services via deal certificate server 162. Zynga or Rovio Mobile may provide gaming services via gaming server 162. Google may provide a calendar service via calendar server 162. Further services and servers may include transportation dispatching server 162, language translation server 162, data storage server 162, concierge offer server 162, purchase agent server 162, and others. These service providers are only exemplary, and within each service category other service providers may be available, or another node of the system may provide like service. Service providers may also perform advertising or publishing functions. Service providers may operate as independent nodes of telecommunications system 100, or may provide copies of their code, databases, systems and the like for local installation on another node of telecommunications system 100. Service may be provided in the form of data feeds, application program interface (API), web services, or any other form of communication available in telecommunications system 100 as would occur to one skilled in the art.

While the nodes of FIG. 1 are illustrated and described as solely communicating using network 110, this is only to be considered a best mode, and not limiting. Various nodes, where possible, may communicate using other forms of communication including phone, fax, in-person meetings, mail, and other forms known in the art. In addition, each node may consist of more or fewer communications devices, personnel, and apparatus than are illustrated. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

User node 120, content provider node 130, publishing node 140, advertising node 150, and service provider node 160 may each provide or receive feed formatted content. Examples herein will typically focus on XML, but it should be understood that other feed formatted content may employ like solutions. The term marker shall typically refer to an element, attribute, or group of elements and attributes within feed formatted content, and the terms marker, element, and attribute shall generally be understood to mean formatted information within feed formatted content.

For the purposes of this application, a competition may be referring to a game of skill or a game of chance. Competitions may be provided by a gaming service provider node 160. The competition may be single participant, multi-participant with each participant competing on their own behalf, or team-based multi-participant with each participant competing on behalf of a team. A "competition result" is defined as any intermediate or final score, intermediate or final victory or loss, or other intermediate or final action or activity that may be recorded during a competition. For example, a competition result may be a knock-down in a fighting game, or the first knock-down in the game. By way of another example, a competition result could be the highest score for a particular week in a fantasy league. For the purposes of this application, a "competition rank" is defined as an individual or team's rank based on one or more competition results. For example, participants may receive a competition rank based on the final scores they receive at the end of a game. By way of another example, competition rank may be based on the highest number of knock-downs in a fighting game. For the purposes of this application, the term "deal competition" is defined as a game or competition for which there is a set of deals or discounts awarded based on the outcome of the game or competition. The phrase "deal payment terms" is defined as the amount an individual must pay in order to receive an amount of product or service. For example, deal payment terms may prescribe that an individual pay $10 for $20 of food and drink at Joe's Bar.

Deals may be redeemed in a variety of ways. For example, an individual may need to print out a certificate and present it at the time of purchase. Alternatively, the individual may be provided with a code that provides a discount for online purchase. By way of another example, the individual may present a certificate, number, bar code, or some combination thereof, displayed on their mobile device, either via a mobile web browser or mobile app. In one embodiment, the individual may register an existing credit or debit card or receive a credit, debit, or other type of card that is associated with the deals they own. Such a credit or debit card may automatically reimburse the individual based on deal terms either at the time of purchase or by a second repayment transaction.

Deals may be brokered in a variety of ways. For example, contract terms between a deals certificate service provider 160 and a vendor may specify that the deal will only be made available for a limited period of time. When that time expires, the online provider of deals will pay the vendor an amount based on the number of deals sold. Alternatively, the contract may specify that the deals certificate service provider has the rights to pre-purchase up to a certain volume of deals. For example, the online provider of deals may purchase 100 certificates valued at $10 from a vendor for a price of $4 each. Or, the online provider of deals may contractually have the option to purchase up to 100 certificates each month at terms such as those noted. By way of another example, the contract could specify prepayment on a total value of deals, with only a certain amount of the total value available for resale each month.

In one embodiment of the present invention, at least one deal competition is provided via a user interface to users. The user interface may be a web page, a computer program, a mobile phone application, or any other user interface as known in the art. The deal competition on the user interface may state, for example: "Compete to win the best price on this deal for $10 worth of purchasing power at Mickey's—it takes at least three to compete in the javelin throw completion—first place gets the $10 for 4 dollars, last place pays full $10, players in between will be spaced proportionately between the first and last place participants payment requirements. Max number of participants for this competition is 10 and competition will start when we have at least 3 participants—The scores will be posted as they occur. Required payments will be displayed upon completion of the competition, which is at 10:00 PM or at the completion of 10 users, whichever comes first."

In one embodiment, a private group can select a closed or private competition with a given number of users. Alternatively, competitions may be open to the public. Requirements for the number of users can be posted on the interface or accepted when a threshold is reached. A minimum or maximum number of participants necessary to start or finish a deal competition may be referred to as a competition participant threshold. A private game may be managed by a first user such that they distribute a link or code to access the private game. In one embodiment, a password may be provided to access the private game. A game may also be provided in conjunction with a social network, such as Facebook, and the privacy of the game may be based on relationships within the social network. For example, players of the popular game Farmville could opt to offer private competitions versus their friends. When a friend of that individual logs in to play Farmville, they could see the invitation to the private deal competition. After joining the deal competition, the players could receive one or more deals based on one or more competition results. Alternatively, all players with access to Farmville could elect to play in a deal competition mode. The deal competition mode could last for a certain period of time after which they receive a deal based on one or more competition results, or the user could buy in to deal competition mode with a certain amount of money and play until it's been spent on one or more deals awarded during competition.

In one embodiment, the game of skill may be a simulated fight, or battle competition, with or without weapons, where each player has an amount of health points and as the player gets, for example, shot, stabbed or punched, they would lose health points until they are depleted. The first player out would get the last place deal and as other players are eliminated they are ranked and get a better deal until the last player standing gets the best deal. Alternatively, for example, all losers could get one deal and the winner gets a better deal. Or again alternatively, a certain number of top place finishers would get a better deal.

In one embodiment, an invitation to compete can be posted by a user on a social network; the invitation would be coded and associated with a competition. In one embodiment the user would select a minimum number of players and a maximum number of players. Deals for each place in the competition would be computed for each number of users. For example, a user viewing the invitation to compete may see a deal set for three users: first place would be pay $6 for $10 at Mickey's Bar, second place would pay $8 for $10 dollars at Mickey's Bar, and third place would pay $10 for $10 at Mickey's Bar. The user viewing the invitation to compete could also see the deal set for when there are 4 players: first place would pay $5 for $20, second place would pay $7 for $10, third place would pay $8 for $10 and fourth place would pay $10 for $10. Alternatively, all players may be required to pay in a fixed amount prior to the beginning of the competition, but the certificate amount they receive as an award deal would be based on the place they finished. For example, all players could pay $10, and first place would receive $20, second place would receive $15, and third place would receive $10.

In one embodiment, the user setting up the challenge could select a winner take all competition, where for example all the losers would pay $10 for $20 and the winner would pay nothing for $10.

In one embodiment, the participants in a single competition may select among a variety of products or service providers from whom they will receive their award deal. For example in a three player completion, player one would be playing for a deal at Joe's bar and get $20 for $5 for first place, $20 for $8 for second place and $20 for $10 for third place, and player two would be playing for a deal at Lin's Salon and get $30 for $10 for first place, $30 for $12 for second place, and $30 for $15 for third place, and player three would play for a deal at Bob's Rib House and get $12 for $1 for first place, $12 for $4 for second place, and $12 for $6 for third place.

In one embodiment, the user setting up the competition could select an extended deal rule set. For example, a commissioner of a 10 player fantasy football league could set up deals for the weekly head to head competitions, along with a deal for the highest point scoring team for the week. In the two-player head-to-head weekly competitions, the winning player could get a more favorable deal than the loser. In the 10-player weekly high point competition, all losers could have to pay more for the deal than the winner. The 10 players could be ranked and payment for their deal would be based on their rank. At the end of the season deal competitions could also be set up for the playoffs and championship.

In one embodiment, vendors who are involved with deals can allow other vendors to subsidize their deal. The vendor involved with the deal may, for example, select only non-competing entities. These non-competing entities can then provide an add-on deal by providing their own deal. In one embodiment the competition provider would get a fee for the ability to place the add-on deal that can be used in part or in full to make the deal more attractive to the consumer or provide direct payment in whole or in part to the vendor associated with the competition. In one embodiment, a second vendor may subsidize a first vendor's deal by placing a coupon on a page that must be printed out for redemption of the first vendor's deal. For example, the top half of a page could be a certificate for $12 at Bob's Rib House, where the bottom half of the page has a coupon for a discount on a case of Budweiser™. In one embodiment, the deal competition for $12 to Bob's Rib House may generally require a $2 payment from the first place finisher in the competition, but because the Budweiser coupon will be placed on the certificate the participant may only be required to pay $1. A deal or coupon accompanying a deal awarded based on a deal competition may be referred to as an add-on deal.

In one embodiment of the present invention, a vendor may provide additional services to the participants in a game or competition. For example, in conjunction with a fantasy sports provider such as Yahoo!™, Buffalo Wild Wings™ may provide a paid package for leagues including one or more deal competitions. A ten player league may pay $200 to have a Buffalo Wild Wings fantasy league package. The package may include a draft party with reserved table at Buffalo Wild Wings and one hundred wings. The package may further include deal competitions as described above for head-to-head play, playoffs and weekly point winners.

In one embodiment, deal competition participants may be granted certain preferred participant status in association with one or more vendors. For example, a participant who has selected to play specifically for deals at Joe's Bar more times than any other participant in the system may be granted preferred participant status with respect to Joe's Bar. In one embodiment, the success or failure within the competitions may influence the preferred participant status. For example, a participant who has won the most deals, or the best deals in aggregate, from Joe's Bar may be granted preferred participant status. In one embodiment, preferred participant status may be granted to more than one participant. Unrelated participants may be granted preferred participant status at the same location. Alternatively, a participant who has been granted preferred participant status may extend further preferred participant grants to friends or associates. Preferred participant status may grant the participant discounts off of or additions to the standard deal payment terms. Preferred participant status may grant entirely separate standing deals to the holder of that status such as a reserved table at a restaurant, set menu item discounts, or the like. Further, different levels of preferred participant status may be granted. For example, a participant with the top preferred participant status for a venue may be given set menu item discounts during popular hours such as 6-8 pm on weeknights. Whereas a participant with the second level down preferred participant status for the same venue may be given the same set menu item discount during less popular hours such as 4-6 pm on weeknights.

In one embodiment, preferred participant status may be tracked and granted based on a loyalty point program, or loyalty participation. Loyalty points, or loyalty participation, may be provided based on deal competition participation, based on success or failure within deal competitions, based on redemption of deals, based on patronage, or any combination of these or the like.

Referring again to the example of the simulated fight game of skill, loyalty points or preferred participant status may impact the health points of an individual or a team. For example, an individual with preferred participant status may receive bonus health points when entering a deal competition. Alternatively, patronage at a venue may impact the health points within the competition in real time. For example, if the individual is participating in the competition at the venue and their health points are getting low, the individual may, for example, order an entrée and receive an immediate boost in health points.

By way of another example, a video game networked through various venues, such as Golden Tee™, could be played in a deal competition mode. In such an instance, the cost to play the game may be significantly higher—for example $20 for a single round—but at the completion of the round participants at various different venues would receive certificates for redemption at the venue in which they are playing based on the results of the round. Again, preferred participant status may be granted or impacted based on participation in such a networked game.

In one embodiment, the location of a user may be identified. Location may be established based up on a known location of an installed gaming console, for example a certain Golden Tee™ game may be known to be installed at a certain location. Alternatively the gaming service provider may utilize an IP-to-geography translation server to identify the geo-location of the user. By way of another example, the user may check in to a location, for example using a social network service. Other users can see them via the interface and challenge them to a deal competition. An instant message could be sent or accepted based on the user preferences. The interface may also show the user's team association and a team challenge could be initiated. In one embodiment the challenge can attach a video file, for example, the challenger taunting the user to compete. In one embodiment there can be a live video chat between the challenger and other potential participants.

In one embodiment, payment may be made only by the losers of a competition. This could be done by allowing the deal to be purchased using the losers account.

In one embodiment, a vendor could access a vendor interface which would provide the vendor a means to sign up to specify a number of deals to be prepaid by a marketing company. For example, Joe's bar would enter the vendor interface and enter into a contract to allow Marketing Co. to purchase up to 30 $20 certificates per month. The upfront payment of these 30 certificates for the first month is $6 dollars per certificate, or $180 in total. The certificates now can be provided to consumers via marketing events on various types of websites, including, for example, sites offering group purchasing deals (like Groupon, or Living Social), those offering straight pay deals (like Restaurant.com), Dutch auction sites (where, for example the $20 certificate is initially offered at $10 and is reduced incrementally over time until a set number are sold), or competition sites as discussed herein.

For a marketing company to automate the prepaid system, the cash flow from operations can be controlled to maintain a predetermined profit margin. In the example above, if the predetermined margin is set at an average selling price of $7 from Marketing Co. to the consumer, the profit margin would be $1 for $6 worth of deal inventory, which equates to a 16.7 percent profit margin. So, for example, if half or 15 are distributed to a Dutch auction site (in this example owned by the Marketing Co.), and the average sale price is $8, then the other 15 certificates, distributed to a deal competition site, again owned by Marketing Co., the average price of the prices paid for the deal by participants in the completion could be as low as $5 to achieve the predetermined margin which requires an average sale price of $7.

Upon completion, or during the marketing event, revenue results from the marketing event (e.g. the Dutch auction, or deal competition) are sent to the operations controller. A revenue requirement for the next event is set based on these received revenue results. Based on the timing of the revenue received from consumers, additional requests from vendors to sell prepaid deals can be accepted and the money sent to the venue. This control allows the marketing company to establish a consumer audience for the deals in one geographical region and then market into new regions. To gain excitement in the new regions the revenue collected from a marketing event could be below the predetermined profit margin in the new region, but brought back from above predetermined profit margins in the established areas.

In one embodiment, a marketing company can also run an add-on interface that allows advertiser node 150 to insert or attach a coupon to the prepaid deal. In one embodiment the add-on interface would allow the advertiser to see the various prepaid certificates in the marketing company's inventory, listing by location and category (bar, restaurant, salon, theater, etc.). The advertiser could then purchase add-on placement for the certificates purchased. This could be in the form of a coupon, attachment to certificate, or add-on codes.

For example, the advertiser could be Budweiser Beer. Bud could purchase 30 add-on coupons (for $5 dollars off case of Bud) from the Marketing Co. for $1 each via the interface. If Marketing Co. maintains the predetermined margin it could, in the example above, reduce the competition price payout by the $1 add-on coupon to set an average of $4 per participant.

In one embodiment, a team can claim a restaurant as its domain and have the right to take on all competitors to its domain. For example, A-Team has won domain of Joe's Bar because its members have all purchased certificates to Joe's Bar from Marketing Co. Any new certificates requested by Joe's Bar and accepted by Marketing Co. could be placed on a competition site and A-Team would fight all competitors. For example, if the competition was a fight where each member of the A-Team was provided with a fortress that could not be penetrated with less than 100 hits and each challenger was given 20 hit capability and 20 health points, the threshold number of the competing team could be set at 6 team members. So in this example B-Team has 6 members and the siege of the fortress begins. Either team can ask new members to join during the battle which can end at a predetermined time—for example 5 minutes. If the B-team penetrates the fortress they claim Joe's Bar as there Domain. In one embodiment players can be set to autoplay so that they can compete without the participant actively controlling the action. If the fortress is penetrated, B-Team would be given a superior deal to A-team. So, for example, A-Team would get $20 certificates for $10 and B-Team would get $20 certificates for $5. By recruiting new players into the competition, a team may receive better deals if they win, and Joe's Bar can get more customers. In one embodiment, players can get additional hit points and/or health points for purchasing items at the bar. For example, buying a round for the table at Joe's Bar could be indicated by a signal sent to the marketing company gaming server 162 by an informing party, for example, the waiter at Joe's Bar. Advertiser's can get in the action through the add-on site by paying for the right to provide a team more health or hit points if they purchase their product at Joe's Bar or if they purchase an advertiser deal or certificate. For Example, Budweiser™ could pay to subsidize the certificates won by having the right to insert their $5 off coupon with the competition certificates. Alternatively, Budweiser™ can pay Marketing Co. for the right to double the health points received if Budweiser™ Beer is purchased in Joe's Bar instead of a different brand. While this example has focused on team-based play, it should be understood that these features may be offered to individual players.

Figure 2:
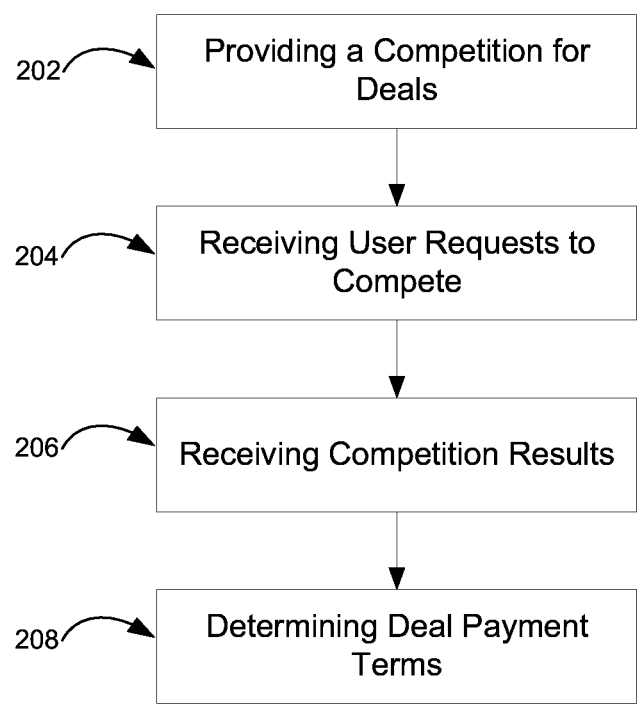
FIG. 2 illustrates one embodiment of a flowchart representative of a deal competition in accordance with the present invention.

FIG. 2 depicts a method of providing a deal competition. Specifically, a stage 202 of flowchart 200 illustrates providing a competition for deals, for example discounted certificates. At least one deal is associated with at least one competition, the association stored for example at gaming server 162. A stage 204 illustrates receiving a user request to compete. One user request may be received, or a plurality. A stage 206 illustrates receiving competition results. Finally, a stage 208 illustrates determining deal payment terms, for example based on the competition results of the competition.

In further respect to flowchart 200, a user payment may be determined based on the determined deal payment terms from at least a portion of the participants. In one embodiment, stage 204 may require the user to pay a user entry deal fee. Deal payment terms may be determined based on the number of user requests. The required user payment may be determined based at least in part upon ranking the participants and associating a payment based on the ranking. The competition and deal may be selected by a user. The participants may be selected by a user. A user may select a private party and be given a link to invite the participants. A competition participant threshold may be set for a predetermined number of participants. The user payment may be further based on a predetermined profit margin associated with the competition. The user payment may be further based on a predetermined profit margin associated with a plurality of deals and associated competitions. The required payment may be displayed for each place in the competition. A score to beat may be displayed during the competition. The competition for the deal may have a specified start time. The competition may comprise question answering. The competition may comprise a game of skill. The competition may comprise a game of chance. The user payment may be determined based on a predetermined profit margin associated with one deal. The predetermined profit margin may be associated with a plurality of competitions. The predetermined profit margin may be associated with a plurality of deals. The predetermined profit margin may be associated with a plurality of deals and associated competitions. At least one add-on deal may be associated with at least a portion of the participants. An add-on deal associated with the participants may be based on a competition rank. Flowchart 200 and the additional described embodiments may be executed, for example, on the networks and computer readable storage mediums detailed in telecommunication system 100.

Figure 3:
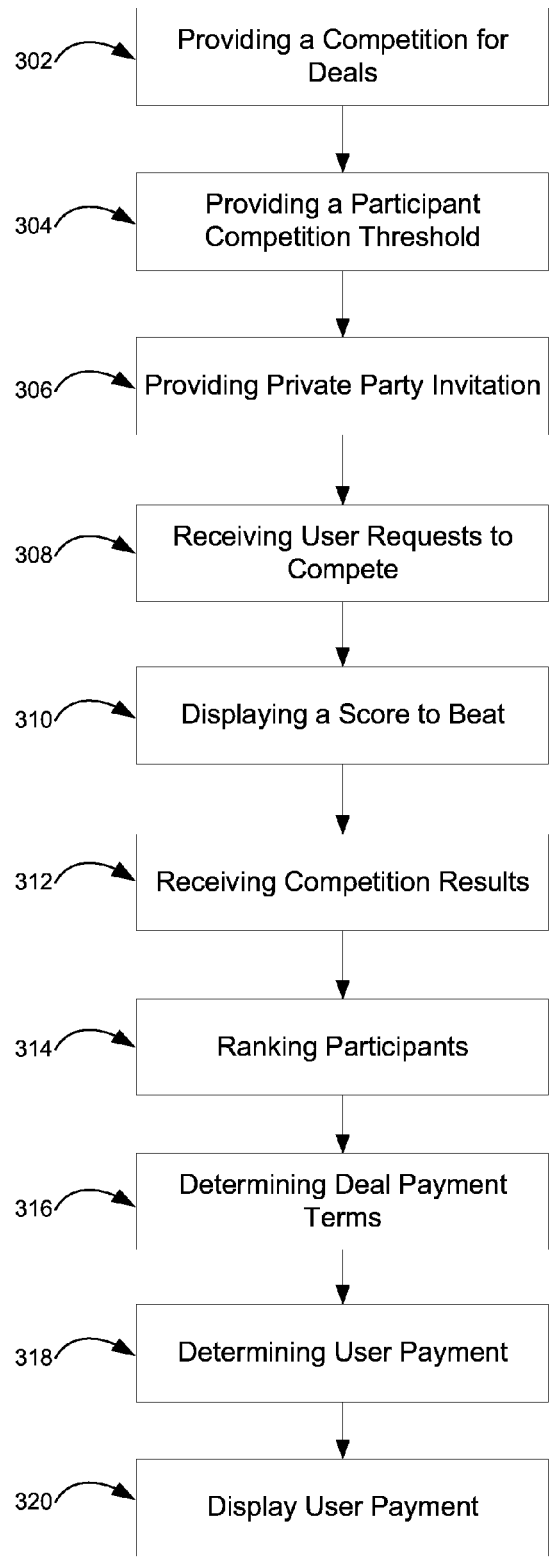
FIG. 3 illustrates one embodiment of a flowchart representative of a deal competition in accordance with the present invention.

FIG. 3 depicts a method of providing a deal competition. Specifically a stage 302 of flowchart 300 illustrates providing a competition for deals, for example discounted certificates. A stage 304 illustrates providing a participant competition threshold. A stage 306 illustrates providing a private party invitation. A stage 308 illustrates receiving user requests to compete. A stage 310 illustrates displaying a score to beat. A stage 312 illustrates receiving competition results. A stage 314 illustrates ranking participants. A stage 316 illustrates determining deal payment terms. A stage 318 illustrates determining user payment. A stage 320 illustrates displaying user payment. Flowchart 300 may be executed, for example, on the networks and computer readable storage mediums detailed in telecommunication system 100.

In one embodiment, deal payment terms are based on the number of user requests. In one embodiment, determining the required user payment comprises ranking the participants and associating a payment based on the ranking. In one embodiment, the competition and deal are selected by a user. In one embodiment, the participants are selected by a user. In one embodiment, a user selects a private party and is given a link to invite the participants. In one embodiment, determining the user payment is further based on a predetermined profit margin associated with the competition. In one embodiment, determining the user payment is further based on a predetermined profit margin associated with a plurality of deals and associated competitions. In one embodiment, the score to beat is displayed during the competition. In one embodiment, the competition for the deal has a specified start time. In one embodiment, the competition comprises question answering. In one embodiment, the competition comprises a game of skill. In one embodiment, the competition comprises a game of chance. In one embodiment, determining the deal payment terms is further based on a predetermined profit margin. In one embodiment, the predetermined profit margin is associated with the competition. In one embodiment, the predetermined profit margin is associated with the deal. In one embodiment, the predetermined profit margin is associated with a plurality of competitions. In one embodiment, the predetermined profit margin is associated with a plurality of deals. In one embodiment, the predetermined profit margin is associated with a plurality of deals and associated competitions. In one embodiment, displaying required user payment comprises displaying a required payment for each place in the competition based on the deal payment terms.

Figure 4:
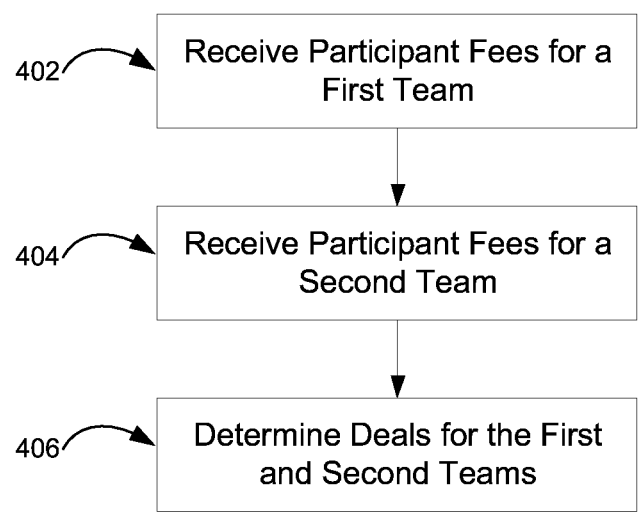
FIG. 4 illustrates one embodiment of a flowchart representative of a deal competition in accordance with the present invention.

FIG. 4 depicts a method of providing a deal competition. Specifically a stage 402 of flowchart 400 illustrates receiving participant fees for a first team. A stage 404 illustrates receiving participant fees for a second team. A stage 406 illustrates determining deals for the first and second teams. Flowchart 400 may be executed, for example, on the networks and computer readable storage mediums detailed in telecommunication system 100.

In one embodiment, the participant fees for the second team of participants are greater than the participant fees for the first team of participants. In one embodiment, the first team fees and the second team fees are determined based on a team loyalty program rating. In one embodiment, the deal competition comprises a battle competition, and wherein health points are added based on loyalty participation. Healthy points may be added based on loyalty participation during a competition. In one embodiment, the health points are added based on loyalty participation during the competition. In one embodiment, loyalty points are sponsored by a third party.

Figure 5:
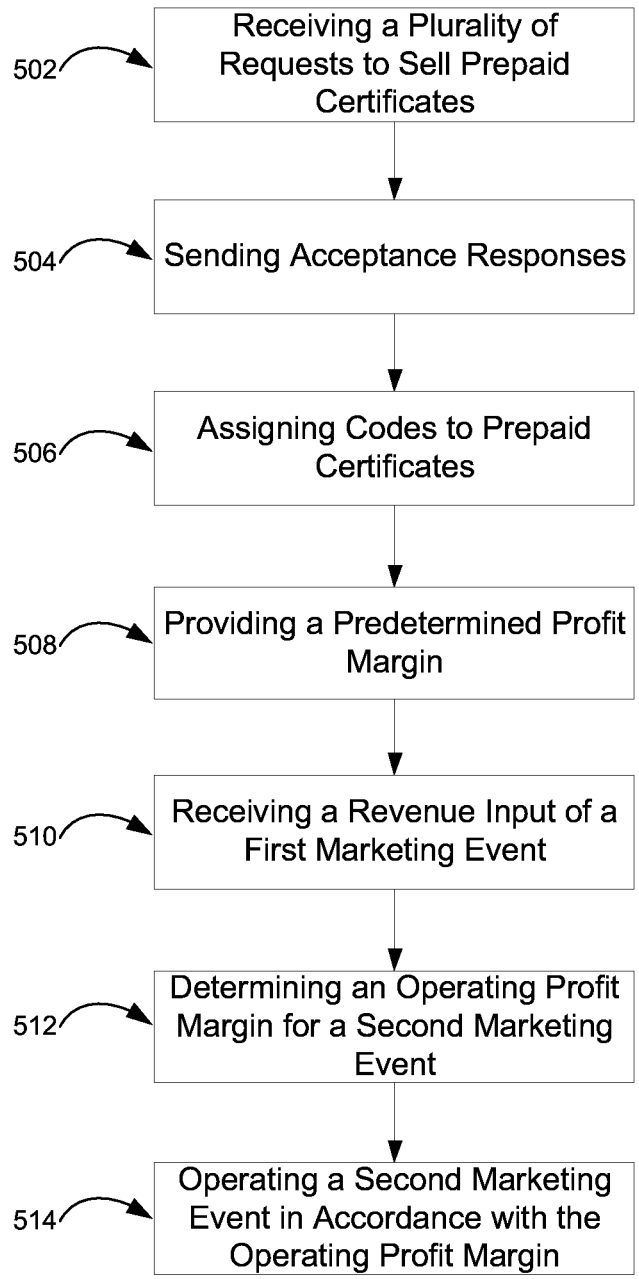
FIG. 5 illustrates one embodiment of a flowchart representative of marketing deals in accordance with the present invention.

FIG. 5 depicts a method of marketing deals. Specifically a stage 502 of flowchart 500 illustrates receiving a plurality of requests to sell a number of prepaid certificates from a plurality of vendors. A stage 504 illustrates sending acceptance responses to the vendors based on the requests. A stage 506 illustrates assigning a code for each prepaid certificate. A stage 508 illustrates providing a predetermined profit margin for sale of the certificates. A stage 510 illustrates receiving a revenue input based on results of a first marketing event. A stage 512 illustrates determining an operating profit margin for a second marketing event based on the received revenue input and the predetermined profit margin. A stage 514 illustrates operating a second marketing event in accordance with the operating profit margin.

In one embodiment, at least one add-on request may be received from an advertiser for a number of add-on advertisements. An acceptance may be sent based on the add-on request. An operating profit margin may be determined for the second marketing event based on the add-on advertisements. The first marketing event may be operated without a predetermined average certificate sale price, for example, a Dutch auction. A type of event for the second marketing event may be based on the revenue input from the first marketing event. Acceptance responses may comprise sending an electronic payment. Some or all of flowchart 500 and the additional described embodiments of that process may be executed, for example, on the networks and computer readable storage mediums detailed in telecommunication system 100.

Figure 6:
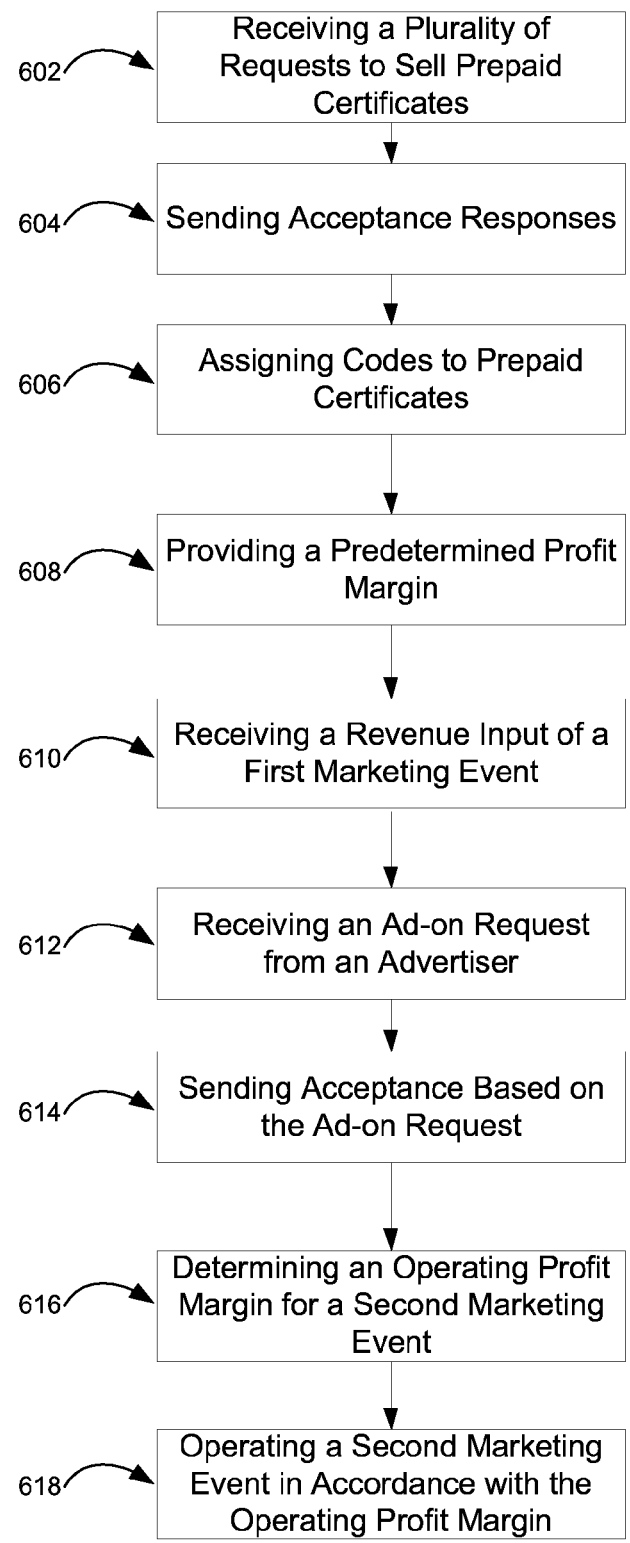
FIG. 6 illustrates one embodiment of a flowchart representative of marketing deals in accordance with the present invention.

FIG. 6 depicts a method of marketing deals. Specifically a stage 602 of flowchart 600 illustrates receiving a plurality of requests to sell a number of prepaid certificates from a plurality of vendors. A stage 604 illustrates sending acceptance responses to the vendors based on the requests. A stage 606 illustrates assigning a code for each prepaid certificate. A stage 608 illustrates providing a predetermined profit margin for sale of the certificates. A stage 610 illustrates receiving a revenue input based on results of a first marketing event. A stage 612 illustrates receiving at least one add-on request from an advertiser for a number of add-on advertisements. A stage 614 illustrates sending an acceptance based on the add-on request. A stage 616 illustrates determining the operating profit margin for the second marketing event based on the add-on advertisements.

In one embodiment, the first marketing event is operated without a predetermined average certificate sale price. In one embodiment, the first marketing event is a Dutch auction. In one embodiment, a type of event for the second marketing event is based on the revenue input from the first marketing event. In one embodiment, sending acceptance responses comprises sending an electronic payment.

Figure 7:
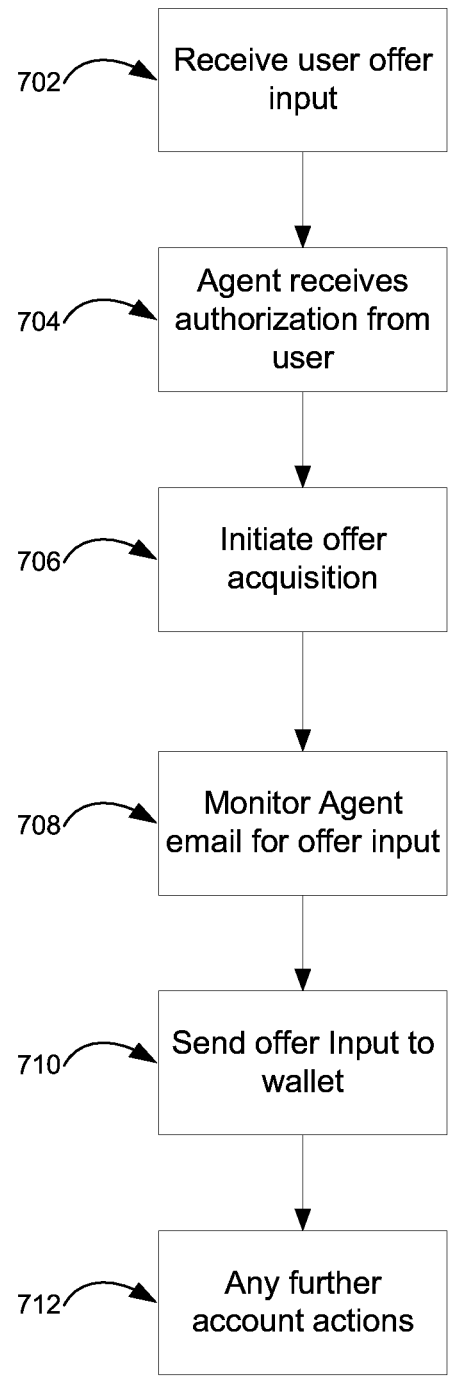
FIG. 7 illustrates one embodiment of a flowchart representative of agent-based offer acquisition.

FIG. 7 depicts a method of agent-based offer acquisition. Specifically a stage 702 of flowchart 700 illustrates a user providing offer input to select an offer, which may include a purchase of a coupon. The user may also choose to flag a deal that is no longer available as a back deal. The back deal may become available if people want to sell them. A stage 704 illustrates a user agreeing to authorize an agent service at an agent server 162 to use personal information to perform necessary actions to acquire offers. The personal information may be used to create an agent email account, signup for offer locations, provide alerts to user, and facilitate smooth financial transactions. A stage 706 illustrates the agent service initiates the offer acquisition. For example, the agent service may navigate to the offer location based on offer link, and navigates through forms on the site to acquire deal. This may include a signup process which will pull information from user data storage and populate the signup page. The agent service will also recognize a known account exists for this user with this deal service provider and will log in. The agent service will then assume responsibility for monitoring this account and interpreting transmissions back to the user. Alternatively, the agent service may utilize an API to process the purchase on behalf of the user. A stage 708 illustrates the agent service parsing useful offer information from email transmissions sent to the agent email account from the offer location. A stage 710 illustrates the agent service sending information to wallet location. The agent service is responsible for checking the agent email account for purchased offers information placing offers in the wallet. A stage 712 illustrates the agent service performing additional account actions such as alerting the user that an offer has been placed in the wallet.

Figure 8:
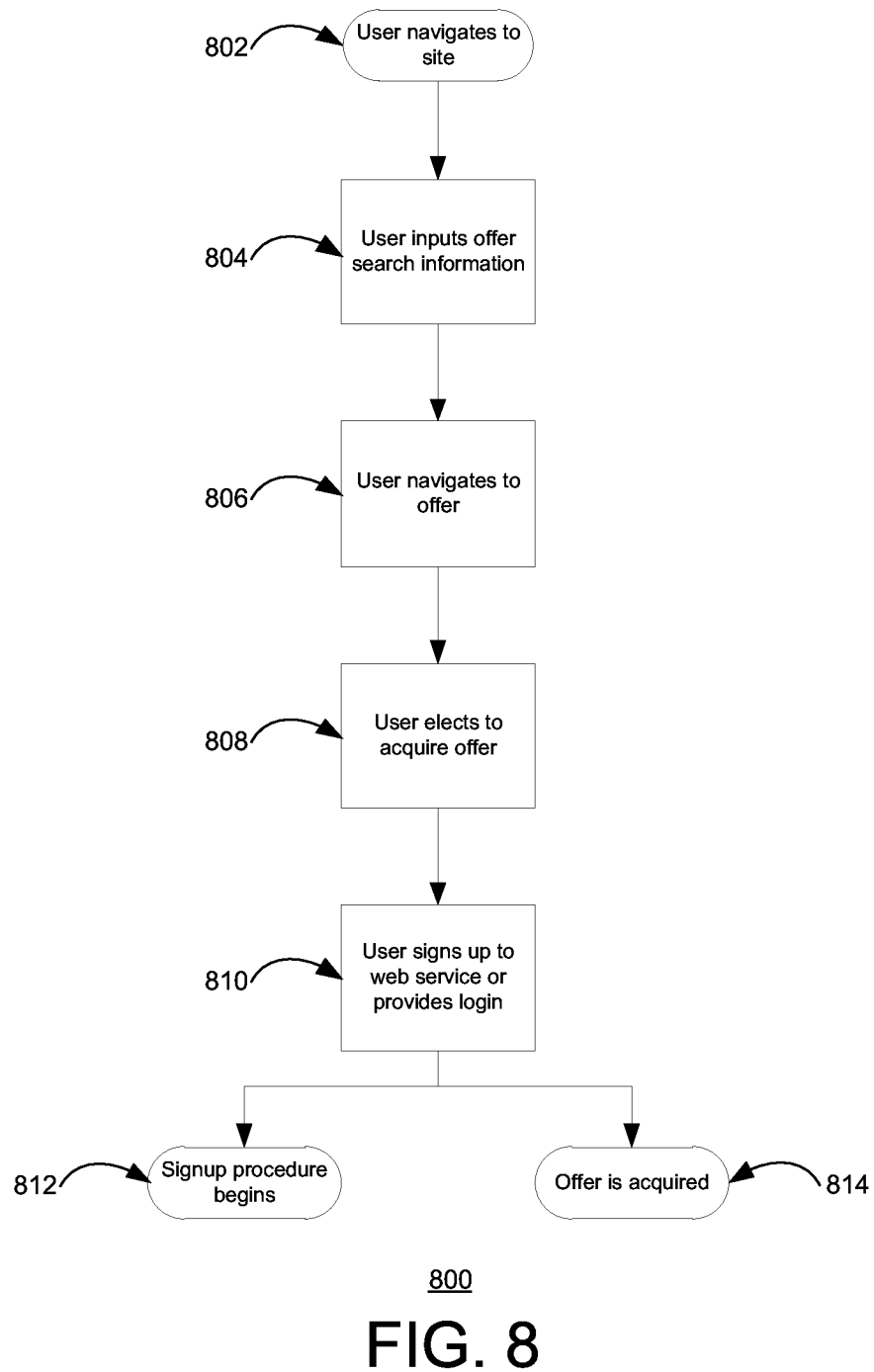
FIG. 8 illustrates one embodiment of a flowchart representative of receiving offer input from user.

FIG. 8 depicts a method of receiving offer input from user. Specifically a stage 802 of flowchart 800 illustrates a user navigating to an agent-based purchase site hosted by agent server 162. A stage 804 illustrates a user entering searching information. A stage 806 illustrates a user navigating to an offer. A stage 808 illustrates a user electing to acquire the offer. A stage 810 illustrates the user registering with the agent-based purchase service or logging in to an existing agent-based purchase account. If the user has not yet registered, a stage 812 illustrates initiating the sign up process. If the user already has an account and logs in, a stage 814 illustrates acquisition of the offer by the agent-based service.

Figure 9:
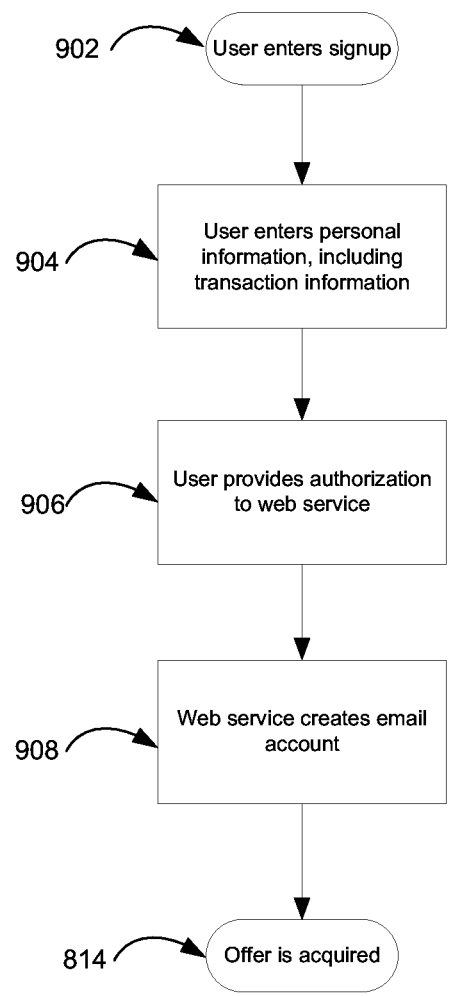
FIG. 9 illustrates one embodiment of a flowchart of processes that occur during the signup and authorization in an agent-based offer acquisition.

FIG. 9 depicts processes that occur during the signup and authorization in an agent-based offer acquisition. Specifically a stage 902 illustrates a user entering a sign up process with an agent-based purchase site hosted by agent server 162. A stage 904 illustrates the user entering personal information including transaction information such as, for example, credit card information. A stage 906 illustrates the user providing authorization to the agent-based purchase service's web service to acquire offers on the user's behalf. A stage 908 illustrates the web service creating an email account associated with the user. A stage 812, as noted in flowchart 800, illustrates acquisition of an offer by the agent-based service.

Figure 10A:
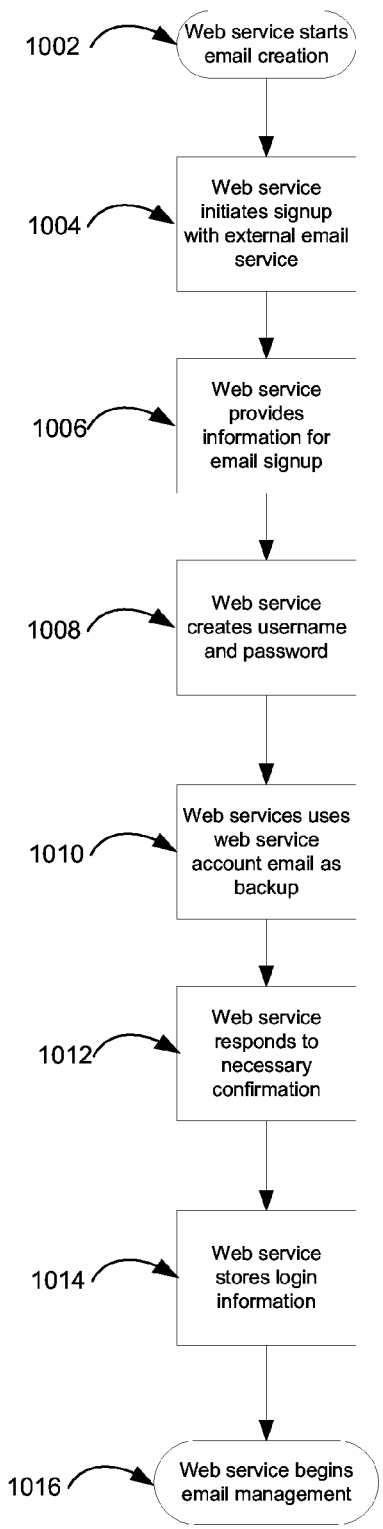
FIG. 10A illustrates one embodiment of a flowchart of an email account creation procedure for agent-based offer acquisition using an external email service provider.
Figure 10B:
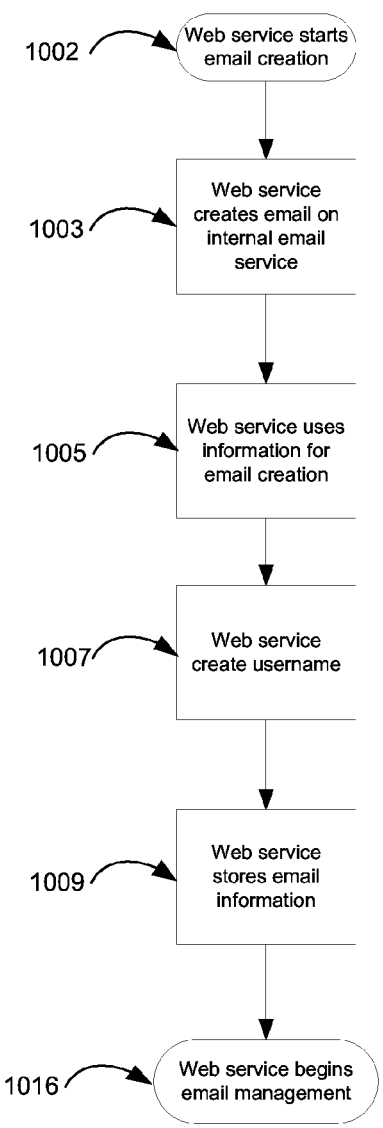
FIG. 10B illustrates one embodiment of a flowchart of an email account creation procedure for agent-based offer acquisition using an internal email service provider.

FIGS. 10A and 10B depict methods of email account creation procedures. FIG. 10A depicts a method of an email account creation procedure for agent-based offer acquisition using an external email service provider. A stage 1002 of flowchart 1000A illustrates a web service of agent server 162 beginning an email creation process. A stage 1004 illustrates the web service initiating signup with an external email service, for example a free email service such as Hotmail or Gmail. A stage 1006 illustrates the web service providing information for email signup. This information may include such information as first and last name, phone number, age, location, or the like. Real personal information associated with a user of the agent-based offer acquisition service may be used during email account signup. Alternatively, it may be desirable to keep the associated user anonymous and false information may be provided. A stage 1008 illustrates the web service creating a username and password. The username again may or may not be based on personal information associated with a user of the agent-based offer acquisition service. A stage 1010 illustrates the web service providing a web service managed email account as a backup email account. Some email service providers request or require a backup email account for password resetting and the like. A stage 1012 illustrates the web service responding to any necessary account creation confirmations. A stage 1014 illustrates the web service storing the login information, including username and password, associated with a user of the agent-based offer acquisition service. A stage 1016 illustrates the web service beginning email management of offers received on the account created in this process.

FIG. 10B depicts a method of an email account creation procedure for agent-based offer acquisition using an internal email service provider. A stage 1002 again illustrates the beginning an email creation process. A stage 1003 illustrates the web service creating an email account on an internal email service, as in an email service managed and maintained by the agent-based offer acquisition service. A stage 1005 illustrates the web service using information for the email creation. This information may or may not be based on personal information associated with a user of the service. A stage 1007 illustrates the web service creating the username. Again, the username may or may not be based on personal information associated with a user of the service. A stage 1009 illustrates the web service storing the email information. Again, stage 1016 illustrates the web service beginning email management of offers received on the account created in this process. In one embodiment, creation of the email account on the internal email service may not require an account to be set up. The email service may not distinguish inbound emails as belonging to different accounts, but simply may parse the entire content of the message and associate the information with the correct user account based on the address to which the email is sent.

Figure 11A:
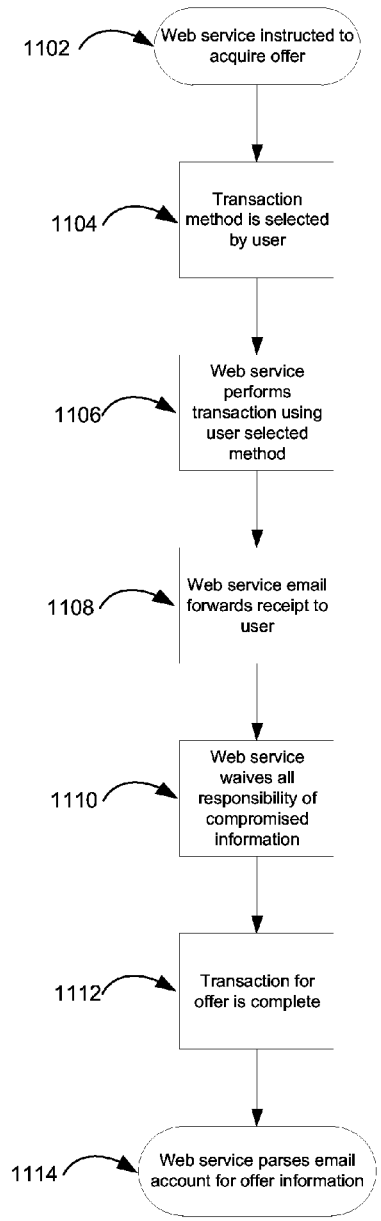
FIG. 11A illustrates one embodiment of a flowchart of a direct transaction method for agent-based offer acquisition.
Figure 11B:
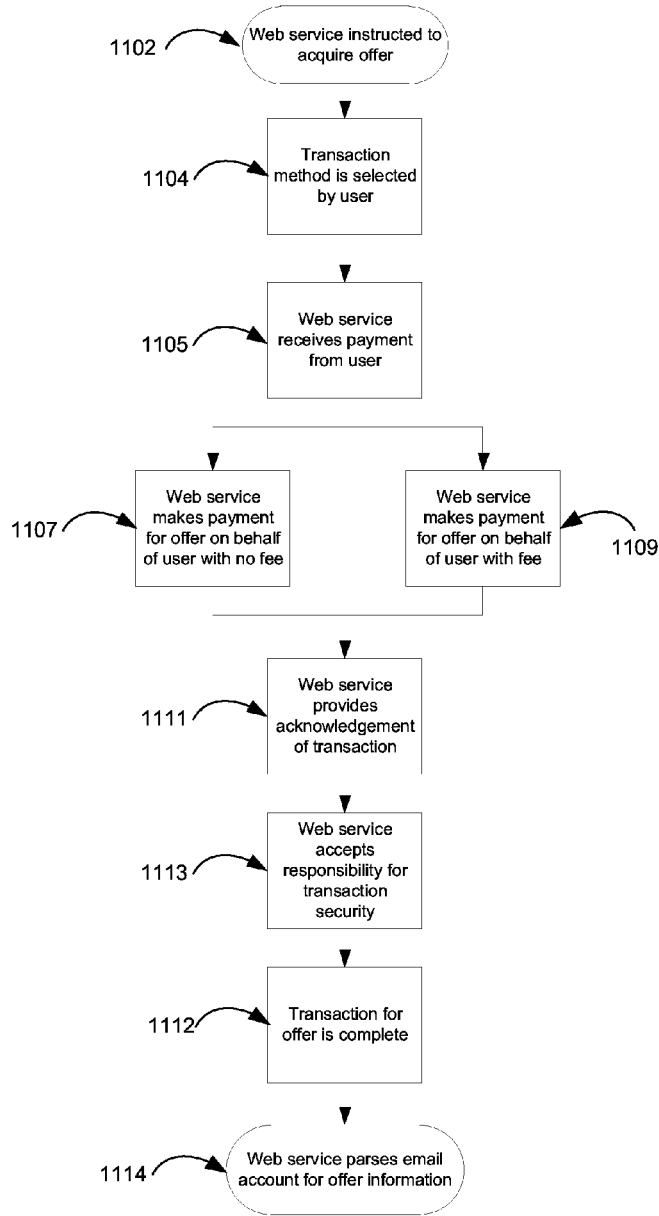
FIG. 11B illustrates one embodiment of a flowchart of a secure transaction method for agent-based offer acquisition.

FIGS. 11A and 11B depict transaction methods for agent-based offer acquisition. FIG. 11A depicts a method of a direct transaction method for agent-based offer acquisition. A stage 1102 of flowchart 1100A illustrates the web service being instructed to acquire an offer. A stage 1104 illustrates the user selecting a transaction method. A stage 1106 illustrates the web service performing the transaction based on the user selected method. A stage 1108 illustrates the web service forwarding information in a receipt email associated with the purchase to the user. A stage 1110 illustrates the web service waiving responsibility for any compromised information related to the transaction. Stage 1110 may be required prior to the transaction being initiated, or the waiver may be provided at some other point, for example in association with the receipt information. Stage 1112 illustrates completion of the transaction. Stage 1114 illustrates the web service parsing emails sent to the managed email account for offer information.

FIG. 11B depicts a method of a secure transaction method for agent-based offer acquisition. Stage 1102 again illustrates the web service being instructed to acquire an offer, and stage 1104 illustrates the user selecting a transaction method. A stage 1105 illustrates the web service receiving payment from the user. In one embodiment the process may then continue to a stage 1107 wherein the web service makes payment for the offer on behalf of the user and receives no additional fee. The additional fee may be charged from the payment submitted by the user, or may be received from the offer service, for example through an affiliate program. In an alternative embodiment, the process may continue from stage 1105 to a stage 1109 which illustrates the web service making payment on behalf of the user and receiving a fee. A stage 1111 illustrates the web service providing acknowledgement of the transaction. A stage 1113 illustrates the web service accepting responsibility of the security of the transaction. Again, stage 1112 illustrates completion of the transaction, and stage 1114 illustrates the web service parsing emails sent to the managed email account for offer information.

Figure 12:
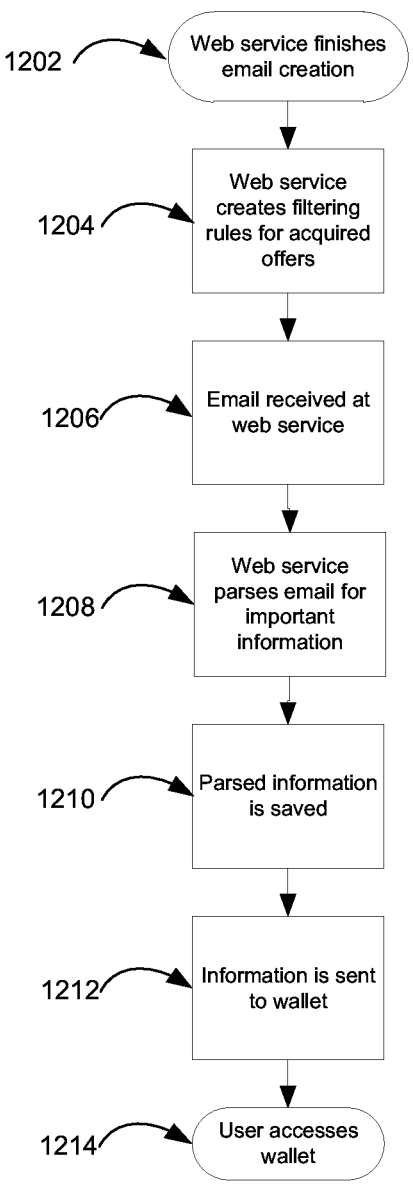
FIG. 12 illustrates one embodiment of a flowchart of an email filtering and parsing procedure controlled by an agent-based offer acquisition web service.

FIG. 12 depicts a method of an email filtering and parsing procedure controlled by an agent-based offer acquisition web service. A stage 1202 of flowchart 1200 illustrates the web service finishing email creation. A stage 1204 illustrates the web service creating filtering rules for acquired offers. Filtering rules may be based on the offer site, or based on preferences provided by an end user. A stage 1206 illustrates receiving an email at the web service, for example an email from an offer site sent to a managed email account. A stage 1208 illustrates the web service parsing the email for information deemed important based on the filtering rules. A stage 1210 illustrates saving at least a portion of the parsed information. A stage 1212 illustrates sending at least a portion of the information to a user's wallet. A stage 1214 illustrates a user accessing the wallet and the provided information.

Figure 13:
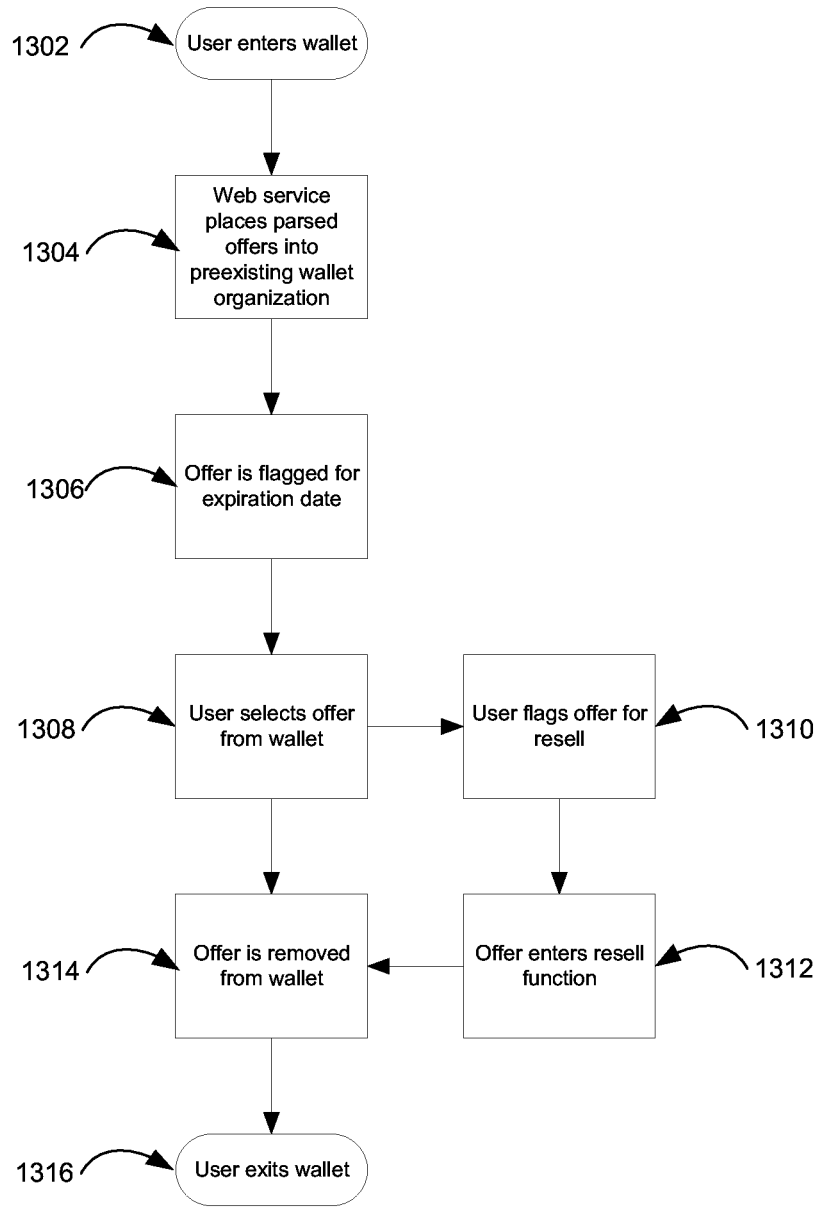
FIG. 13 illustrates one embodiment of a flowchart of offer organization within an offer wallet.

FIG. 13 depicts a method of offer organization within an offer wallet. A stage 1302 of flowchart 1300 illustrates a user entering the user's wallet. A stage 1304 illustrates the web service placing parsed offers into a preexisting wallet organization. The preexisting wallet organization may be, for example, to indicate which offers are used, unused, expiring, expired, for sale, or other categorizations as may be helpful to the user. A stage 1306 illustrates an offer existing that is flagged for having an upcoming expiration date. A stage 1308 illustrates the user selecting an offer from the wallet. If the user is electing not to use the offer, but to sell it, the process progresses to a stage 1310 wherein the user flags the offer to be resold. Then at a stage 1312 the offer enters a resell function. If the user elects to use the offer, or after the offer enters the resell function, the process progresses to a stage 1314 wherein the offer is removed from the wallet. Removing the offer from the wallet may comprise changing its place in the preexisting organization, or removing it entirely. A stage 1316 illustrates the user exiting the wallet.

Figure 14:
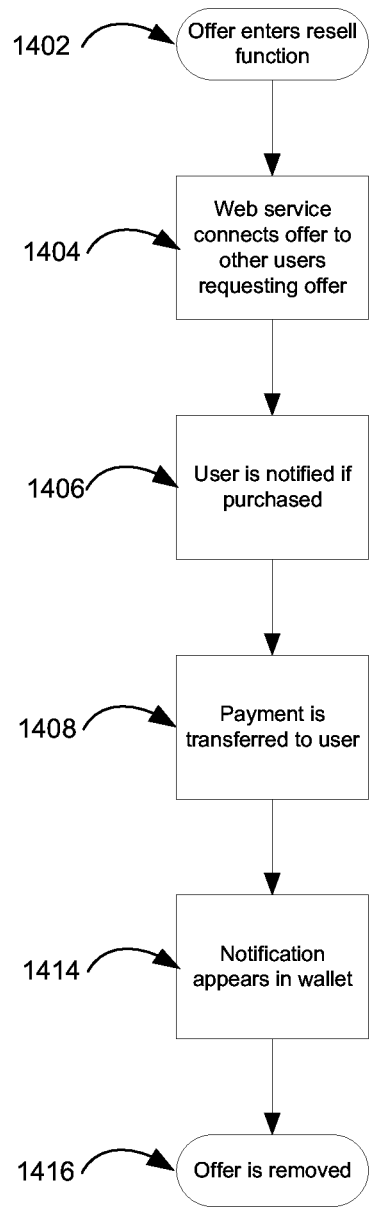
FIG. 14 illustrates one embodiment of a flowchart of a resell function associated with an offer wallet.

FIG. 14 depicts a resell function associated with an offer wallet. A stage 1402 of flowchart 1400 illustrates an offer entering the resell function. A stage 1404 illustrates a web service connecting the offer to other users requesting an offer. The other users may be requesting that specific offer, or requesting an offer in general. The other users may be requesting the offer in advance of the offer entering the resell function, or they may request the offer after it is available. A stage 1406 illustrates notifying the user who provided the offer to the resell function of the sale of the offer. A stage 1408 illustrates transferring payment to that user. A stage 1414 illustrates notification appearing in the offer wallet. A stage 1416 illustrates removal of the offer from the resell function.

Figure 15:
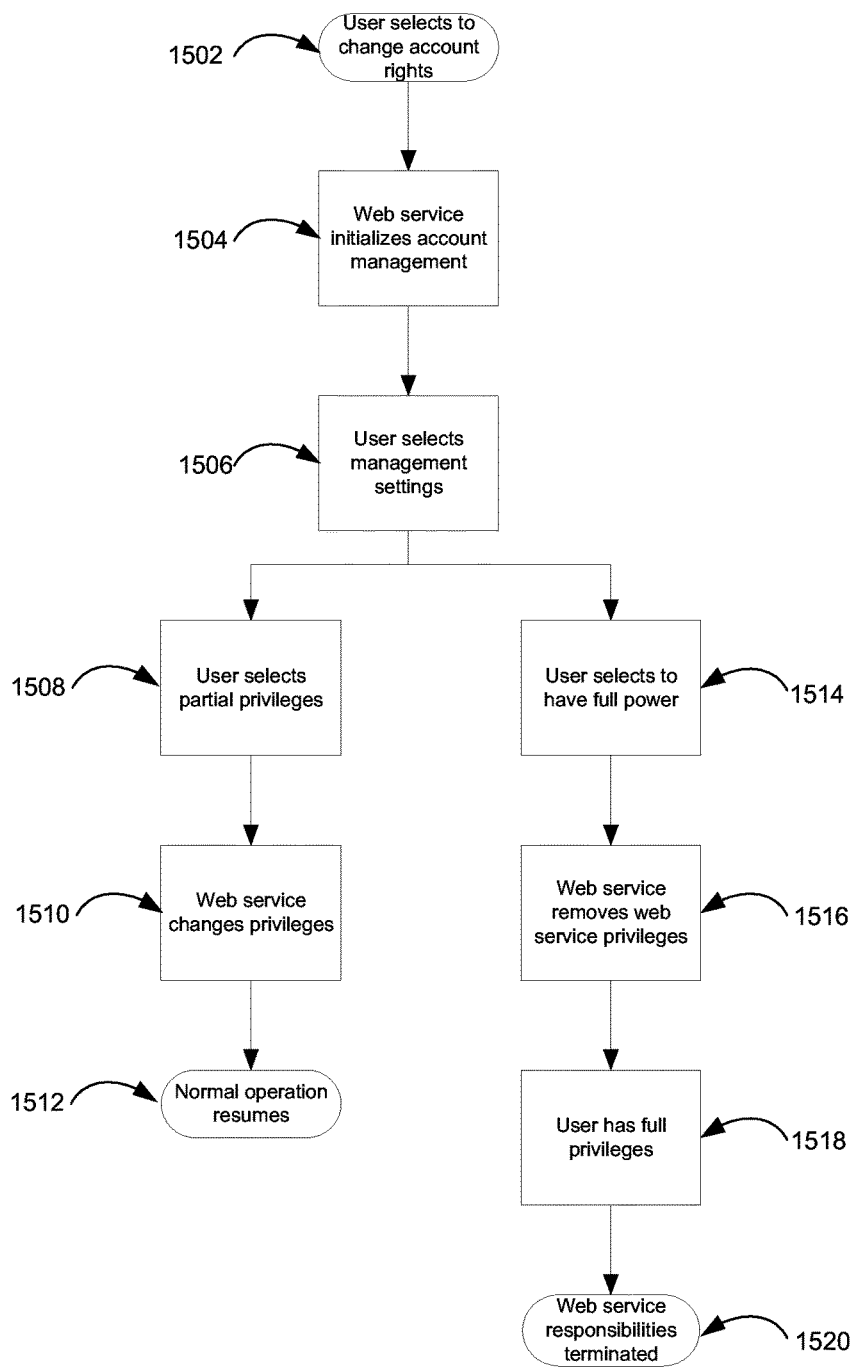
FIG. 15 illustrates one embodiment of a flowchart of responsibility transfer of agent-managed offer site accounts.

FIG. 15 depicts a method of responsibility transfer of agent-managed offer site accounts. A stage 1502 of flowchart 1500 illustrates a user selecting to change account rights. A stage 1504 illustrates a web service initializing account management. A stage 1506 illustrates the user selecting management settings. In one path, the user selects partial privilege at stage 1508. The web service then changes privilege levels based on the user selection at stage 1510. At stage 1512 normal agent-based acquisition operation resumes. In an alternate path, after stage 1506 the user selects to have full power at stage 1514. A stage 1516 illustrates the web service removing its privileges associated with the account. For example, the web service may delete the account information including username and password from its database. A stage 1518 illustrates the user receiving full privileges to the account. For example, the web service may have provided the username and password information to the user. A stage 1520 illustrates termination of the web service responsibilities in relation to the account.

In one aspect, the invention features a web service that allows for users to navigate to desired offers and once selected can use a user's personal information, entered by the user, to acquire offers online by easing the effort required by the user. When the user signs up for the service, they would input multiple fields of information requested by the service. The service can change the requested fields to meet the signup requirements of other sites if necessary. For offer acquisition requires signup, the service can pull the personal information to fill in the necessary fields. The service will also be in charge of managing previous logins and signup information to make offer acquisition faster.

Embodiments of this aspect of the invention include the following features. In one embodiment, the service creates an email for use by the service to represent the user within the service's system. In another embodiment, the service collects transaction based information to acquire offers that require a purchase. In another embodiment, the service can create information to fill required fields if necessary on offer sites.

In another embodiment, the web service creates an email for the user to be managed by the service from a free online email service. The web service can sign up for the email client, confirm email creation responses, and retain all login information for the email client. In another embodiment, the web service can transfer the email account to be transferred for use by the user. In another embodiment, the web service creates the email under its own domain name. The web service has complete control over the account but is unable to offer the email to be used by the user at a later date.

In another embodiment, the email account can be used to sign up to offer locations requiring an email. The email is then used to hold all communication between the offer site and web service. The web service then becomes the mediator between the email account and the user. This includes using the email and personal information to sign up to offer locations.

In another aspect, the web service is responsible for all offer transactions on behalf of the user. The web service includes the capability to aid in the transaction process for acquiring offers from multiple locations. The web service is responsible for helping create a secure transaction by verifying the offer location's trustworthiness before the acquisition.

In another embodiment, the web service stores transaction based information such as credit card information, pay pal information or other method of pay. In one embodiment, the web service uses the user's transaction information to acquire the offer. The web service would then not be responsible for the secure transfer of information on the offer location site or location. In another embodiment, the web service would mediate the transaction by receiving payment from the user and acquiring the deal with the web services funds. This would allow for the user to keep their transaction information from being used at the offer location. The web service would then be responsible for any compromised information.

In another aspect, the web service manages the created email account for the user. The web service is in charge of managing the account for all functions pertaining to offers, maintenance, and termination of the email account. In one embodiment, the web service manages filters and rules to sort offer information. The web service sets filters to separate offer spam and offers the user requested. The filters separate the emails based on specific characteristics of the emails sent by the offer sites. This can be done through the address of the sender, the content of the email, or the timestamp of the email. In another embodiment, the web service parses important emails for information relating to selected offers. The web service parses the emails for information such as the offer code, specific dates for the offer, offer title etc. set by the web service. The web service receives the parsed information and sends it to the organized wallet area for the user to use.

In another aspect, the web service creates a wallet or collection for the offers the user acquired. The wallet holds all purchased offers and selected offers that the user had specifically selected. The web service provides the wallet location to keep track of the offers for the user to access quickly. The web service can organize the offers for the user based on specific criteria. The web service allows for offers to be displayed in a number of different standards including QR codes, barcodes and any new technology when available. In one embodiment, the web service allows for offers to be resold to other users through a resell program in which the offer can be sold to other users of the web service. The web service also allows for the user to flag offers that other users may resell. In another embodiment, the web service allows the user to share deals with other individuals. The user can chose to share the deal with whomever they choose. In another embodiment, the web service notifies the user of the status of their offers. The web service notifies the user through any number of mediums to get the information to the user.

In another aspect, the web service allows for the email account and information to be transferred from the web services control. This includes multiple levels of account management, depending on the request of the user. In one embodiment, the web service allows for the email privileges to be shared between the user and web service. This allows for the user to filter through other offers and select more offers than given through the web service originally. In another embodiment, the web service terminates all responsibilities and gives full privileges to the user. The user would then manage the email account and lose functionality of the wallet, email parsing, and all other responsibilities of the web service.

Users may select offers based on location, personal preferences, based on recommendations based on previous offers they have purchased, or based on offers that become available through reselling functions. The agent-based offer acquisition provides a safe method of providing personal and transaction information to one trusted source. The user may avoid providing their email address to many different offer sites because the agent-based offer acquisition service creates and manages a proxy email on their behalf that is used to register with offer sites. The agent-based offer acquisition service then filters useful information coming to that proxy email address and delivers it to the user, either by email, via a website, an app, through a digital offer wallet, or the like. If the user wishes to take control of the proxy email address, they may do so using the method previously described.

One embodiment of the present invention incorporates a concierge based method for delivering deal information to a user, for example running on a concierge offer server 162. A method of concierge offer management may comprise the following steps. Entertainment suggestion input may be received by the concierge system. The concierge system searches for entertainment items based on the request. A number of suggestions to return is determined. The selections presented are prioritized based on special availability and proximity.

The concierge system may receive deal request input from the user. Deal request input may include specification of time, entertainment or service type, whether the request is for a date or a casual occasion, location, cuisine, number of attending parties, price range, and other information that may be used in selecting a deal. For example, a user of the deal concierge system may provide deal request input indicating they are interested in having dinner on a particular evening after work. A variety of devices and methods may be used to provide deal request input. For example, a user may use a standard desktop, laptop or tablet computer to provide deal request input via a website or an installed program. Using a mobile device, such as a phone, a user may provide deal request input via an installed app, by speaking into program such as the Siri program provided on the iPhone, by text message, or again via a website.

When the concierge system receives deal request input, a wide variety of deal sources may be reviewed for consideration. These deals may be indexed by the concierge system in advance of receiving the deal request input. Alternatively the concierge system may conduct a real-time review of deal origination sites and services upon receiving the deal request input. Based on the time indicated in the deal request input, the concierge system may consider or eliminate deal from within categories including advance purchase required daily deals, purchasable instant deals, specials or coupons, or a custom negotiation process may be initiated.

The concierge system may, as noted, include a deal request input indicating entertainment or service type. In one embodiment, the concierge system may be configured to provide access to deal for movies, plays, other arts, professional sports matches, massages, pedicures, other personal services.

The concierge system functions to provide a user with customized entertainment or service options, which will be referred to as concierge suggestions. Concierge suggestions may be provided in response to receiving deal request input. Alternatively, concierge suggestions may be provided proactively to a user. For example, a user may have a mobile device that provides updated information to the concierge system indicating the user's location. Based on the user's location, and in one embodiment based on stored user preference information, the concierge system may provide suggestions to the device. The device may vibrate or provide an audible alert indicating the availability of one or more concierge suggestions. Alternatively, one or more applications, or for example a tile on a Windows Phone, could be updated to display concierge suggestions should the user access the application or view the tile on the device. A wide variety of input methods may be used to indicate acceptance of a concierge suggestion. A user may click a link, a button, speak a command, or provide some other concierge suggestion acceptance input.

In one embodiment, the concierge system may be provided access to an account on a calendar service associated with the user. Upon receipt of concierge suggestion acceptance input, the concierge system may create a calendar entry associated with the suggestion. The calendar entry may include time and location associated with the accepted suggestion, and additionally may include a link to information associated with the suggestion. In one embodiment, an invitation associated with the calendar invite may be sent to other parties that will participate. Sending the invitation may be done by the user using the calendar service, or alternatively the concierge service may receive an invite instruction and send the invitations without the user directly interacting with the calendar service.

When the concierge system is provided access to a calendar service, the calendar service may provide an additional source of deal request input. For example, if a user has a calendar entry indicating that the user will be attending a play at a certain theater on a certain date and time, the concierge system may provide a concierge suggestion related to a dinner deal available at a location near the theater. If the user accepts the concierge suggestion, the concierge system may access a reservation service provider and book the dinner.

Further, based on calendar information, the concierge service may receive a request or volunteer a suggestion for a transportation service. The transportation service suggestion may be a recommended route using public transportation, or the suggestion may be for the user to utilize a taxi or limousine service. Suggestion acceptance input related to a transportation service suggestion may initiate several concierge service actions. For example, route and timing information associated with the suggestion may be added to an existing calendar entry, or an additional calendar entry may be created. Also, the concierge service system may interface with a taxi, limousine, or other transportation dispatching service to schedule the transportation. Confirmation numbers or codes related to the transportation reservation may be stored in the concierge service and may be provided in a calendar entry.

In one embodiment, the concierge system may provide food order information in addition to providing a reservation. Continuing the example of the user who has accepted a dining concierge recommendation in advance of a play, the concierge system may note that a limited period of time is available between the reservation time and when the play begins. The concierge system may then provide food order information automatically or based on input from the user. Food order information may be provided as a note associated with the reservation, or alternatively a reservation or ordering service may be provided associated with the restaurant and utilized by the concierge system.

In the event that an accepted concierge suggestion is associated with an advance purchase required daily deal, the concierge system may incorporate or utilize an agent-based offer acquisition service.

Concierge recommendations may be prioritized based on a variety of factors. For example, prioritization may be based on proximity, based on deal type, based on trustworthiness of the offer, based on the total amount of money that will be saved by the user, based on the total amount of money that will be saved by all participating parties, based on the percentage savings by the user, based on the percentage savings by all participating parties, based on reviews or ratings associated with the venue or service, based on what the user has done and enjoyed, based on what all participating parties have done and enjoyed, based on what the user has not done, based on what all participating parties have not done, or based on some combination of these and other factors.

As previously noted, one source of concierge recommendations is a custom negotiation process. A custom negotiation process is an interaction with a venue or service provider to request a deal that is not published to the public at large. The concierge system provides custom negotiation input. The venue or service provider received the custom negotiation input. The venue or service provider evaluates the custom negotiation input and may return a custom negotiated deal. Custom negotiation input may include an identifier associated with a user, number of persons in the party, specific service request information, guaranteed expenditure amount, or other information stored by the concierge service or provided by the user. By providing an identifier associated with the user, the venue or service provider may track patronage and provide custom negotiated deals based on that patronage, or based on the potential of attracting a new patron.

The concierge system may be provided to end users based on a variety of revenue models. The concierge service may be provided based on a one-time fee, or a fixed periodic fee paid by the end user. The concierge service may charge a fixed or variable transaction fee from the user for accepted suggestions. For example, a variable transaction fee may be based on the service utilized. Purchasing an advanced purchase required daily deal may incur one fee, where booking a reservation may incur a different fee. Variable transaction fees may also be based on the total amount spent or the amount saved by the end user. Alternatively, or in addition, the concierge system may receive fees from venues or service providers. In one embodiment a fee may be received from a venue or service provider for providing a suggestion related to that party. Alternatively, or in addition, a fee may be received for accepted suggestions related to that party. Similar calculations may be used for variable transaction fees. A venue or service provider may pay a premium fee for a suggestion accepted by a new patron.

The present invention may be embodied in other specific forms without departing from its spirit or essential characteristics. The described embodiments are to be considered in all respects only as illustrative and not restrictive.

We claim:

1. A non-transitory computer readable storage medium comprising computer executable instructions which, when executed by a processor, cause the processor to perform a method of online marketing comprising:

associating at least one deal with at least one competition, the deal being a discounted certificate;

receiving a plurality of user requests from user nodes at a gaming service provider node to compete for the deal as participants in the competition, each of the participants competing against other of the participants for the deal to generate a competition result determined by the competing of the participants in the competition;

determining deal payment terms for the deal based on the competition result of the competition; and transmitting the deal to at least one of the participants at the user nodes over a telecommunication network in accordance with the determined deal payment terms;

wherein the competition is a network based game provided by the gaming service provider node to the user nodes and operating across the telecommunication network.

2. The non-transitory computer readable storage medium of claim 1, the method further comprising: determining a user payment based on the determined deal payment terms from at least a portion of the participants.

3. The non-transitory computer readable storage medium of claim 2 wherein determining the required user payment comprises ranking the participants and associating a payment based on the ranking.

4. The non-transitory computer readable storage medium of claim 2 wherein determining the user payment is further based on a predetermined profit margin associated with the competition.

5. The non-transitory computer readable storage medium of claim 2 wherein determining the user payment is further based on a predetermined profit margin associated with the deal.

6. The non-transitory computer readable storage medium of claim 2 wherein determining the user payment is further based on a predetermined profit margin associated with a plurality of deals.

7. The non-transitory computer readable storage medium of claim 2 wherein determining the user payment is further based on a predetermined profit margin associated with a plurality of competitions.

8. The non-transitory computer readable storage medium of claim 2 wherein determining the user payment is further based on a predetermined profit margin associated with a plurality of deals and associated competitions.

9. The non-transitory computer readable storage medium of claim 2, the method further comprising: displaying the required payment for each place in the competition based on the deal payment terms.

10. The non-transitory computer readable storage medium of claim 1 wherein determining deal payment terms is based on the number of user requests.

11. The non-transitory computer readable storage medium of claim 1 wherein the competition and deal are selected by a user.

12. The non-transitory computer readable storage medium of claim 1 wherein the participants are selected by a user.

13. The non-transitory computer readable storage medium of claim 12 wherein a user selects a private party and is given a link to invite the participants.

14. The non-transitory computer readable storage medium of claim 1, the method further comprising: setting a competition participant threshold for a predetermined number of participants.

15. The non-transitory computer readable storage medium of claim 1 wherein the user requests to compete requires the user to pay a user entry deal fee.

16. The non-transitory computer readable storage medium of claim 1, the method further comprising: displaying a score to beat during the competition.

17. The non-transitory computer readable storage medium of claim 1 wherein the competition for the deal has a specified start time.

18. The computer readable storage medium of claim 1 wherein the competition comprises question answering.

19. The non-transitory computer readable storage medium of claim 1 wherein the competition comprises a game of skill.

20. The computer readable storage medium of claim 1 wherein the competition comprises a game of chance.

21. The non-transitory computer readable storage medium of claim 1, the method further comprising: associating at least one add-on deal with at least a portion of the participants.

22. The non-transitory computer readable storage medium of claim 21 wherein associating the add-on deal with the participants is based on a competition rank.

23. The non-transitory computer readable storage medium of claim 1, wherein the transmitted deal is a printable certificate.

24. The non-transitory computer readable storage medium of claim 1, wherein the transmitted deal is a code for discount on an online purchase.

25. The non-transitory computer readable storage medium of claim 1, wherein the transmitted deal is at least one of a presentable certificate, number, and bar code displayable on a mobile device.

26. The non-transitory computer readable storage medium of claim 1, wherein the transmitted deal is an automatic credit or debit card reimbursement.

27. The non-transitory computer readable storage medium of claim 1, wherein the game being selected from the group consisting of an arcade video game, a social network game, a simulated fight game, and a fantasy league competition.

* * * * *